(12) United States Patent
Yang

(10) Patent No.: US 11,552,686 B2
(45) Date of Patent: Jan. 10, 2023

(54) BEAM REPORTING BASED ON DETECTION OF A TRIGGER EVENT

(71) Applicant: VIVO MOBILE COMMUNICATION CO., LTD., Guangdong (CN)

(72) Inventor: Yu Yang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 16 days.

(21) Appl. No.: 17/102,282

(22) Filed: Nov. 23, 2020

(65) Prior Publication Data

US 2021/0075490 A1   Mar. 11, 2021

Related U.S. Application Data

(63) Continuation of application No. PCT/CN2019/087547, filed on May 20, 2019.

(30) Foreign Application Priority Data

May 25, 2018 (CN) .......................... 201810516930.0

(51) Int. Cl.
*H04B 7/06* (2006.01)
*H04W 76/27* (2018.01)
*H04W 72/04* (2009.01)
*H04W 80/02* (2009.01)

(52) U.S. Cl.
CPC ......... *H04B 7/0626* (2013.01); *H04B 7/0617* (2013.01); *H04W 72/042* (2013.01); *H04W 72/046* (2013.01); *H04W 76/27* (2018.02); *H04W 80/02* (2013.01)

(58) Field of Classification Search
CPC ... H04B 7/0626; H04B 7/0617; H04W 76/27; H04W 72/042; H04W 72/046; H04W 80/02
See application file for complete search history.

(56) References Cited

U.S. PATENT DOCUMENTS

| | | | |
|---|---|---|---|
| 2012/0201154 A1 | 8/2012 | Chandrasekhar et al. | |
| 2014/0010126 A1* | 1/2014 | Sayana | H04J 3/1694 |
| | | | 370/336 |
| 2014/0329551 A1 | 11/2014 | Ryoo et al. | |
| 2016/0057666 A1 | 2/2016 | Pang et al. | |
| 2017/0214444 A1* | 7/2017 | Nigam | H04B 7/0634 |

(Continued)

FOREIGN PATENT DOCUMENTS

| | | |
|---|---|---|
| CN | 102421118 A | 4/2012 |
| CN | 103546207 A | 1/2014 |

(Continued)

OTHER PUBLICATIONS

RAN2 implication from CSI-RS acquisition, beam managements and L3 mobility Qingdao, China, Jun. 27-29, 2017 (Year: 2017).*
Beam Management and Beam Reporting; Aug. 21-25, 2017; R1-1712836; 7 Pages.
CSI Framework for NR; Oct. 9-13, 2017; R1-1718415; 3 pages.
Discussion on beam measurement and reporting; Apr. 16-20, 2018; R1-1804770; 8 Pages.

(Continued)

*Primary Examiner* — Mewale A Ambaye
(74) *Attorney, Agent, or Firm* — Brooks Kushman P.C.

(57) ABSTRACT

An information processing method and apparatus, a terminal, and a communications device are provided. The method includes: determining, based on detection of a reporting trigger event, whether to report an event-based beam report and/or an event-based channel state information (CSI) report to a network-side device.

12 Claims, 2 Drawing Sheets

(56) References Cited

U.S. PATENT DOCUMENTS

| | | | |
|---|---|---|---|
| 2019/0158166 A1 | 5/2019 | Takano | |
| 2019/0215086 A1* | 7/2019 | Kwak | H04L 1/0693 |
| 2020/0260428 A1* | 8/2020 | Xu | H04W 72/042 |
| 2020/0280996 A1* | 9/2020 | Yang | H04W 72/0413 |
| 2020/0313747 A1* | 10/2020 | Xu | H04B 7/063 |
| 2020/0351066 A1* | 11/2020 | Cirik | H04L 5/0098 |
| 2021/0028843 A1* | 1/2021 | Zhou | H04B 7/0626 |
| 2021/0067220 A1* | 3/2021 | Abdelghaffar | H04L 5/0023 |
| 2021/0067222 A1 | 3/2021 | Yang et al. | |

FOREIGN PATENT DOCUMENTS

| | | |
|---|---|---|
| CN | 104080118 B | 10/2014 |
| CN | 106488472 A | 3/2017 |
| CN | 106576265 B | 4/2017 |
| CN | 107889145 A | 4/2018 |
| CN | 110474667 A | 11/2019 |
| WO | 2018020900 A1 | 2/2018 |

OTHER PUBLICATIONS

Extended Search Report for EP19807095.5; dated May 26, 2021; 14 pages.

RAN2 implications from CSI-RS acquisition, beam managements and L3 mobility; Jun. 27-29, 2017; R2-1707053; 4 pages.

International Preliminary Report on Patentability dated Dec. 10, 2020 issued in PCT/CN2019/087547.

First Office Action dated Apr. 15, 2020 issued in 201810516930.0.

Second Office Action dated Oct. 21, 2020 issued in 201810516930.0.

3GPP TSG RAN WG1 Meeting #92; R1-1801520; Athens, Greece, Feb. 26-Mar. 2, 2018; Remaining Issues on beam measurement and reporting 7 pages.

3GPP TSG RAN WG1 Meeting #92; R1-1803481; Athens, Greece, Feb. 26-Mar. 2, 2018; "Feature lead summary 4 on beam measurement and reporting"; 2 pages.

Examination Report for IN Application No. IN 202027056449 dated Dec. 31, 2021, 6 Pages.

* cited by examiner

BEAM REPORTING BASED ON DETECTION OF A TRIGGER EVENT

CROSS-REFERENCE TO RELATED APPLICATIONS

This application is a continuation application of PCT International Application No. PCT/CN2019/087547 filed on May 20, 2019, which claims priority to Chinese Patent Application No. 201810516930.0, filed in China on May 25, 2018, both disclosures of which are incorporated herein by reference in their entireties.

TECHNICAL FIELD

Embodiments of the present disclosure relate to the field of communications technologies, and in particular, to an information processing method and apparatus, a terminal, and a communications device.

BACKGROUND

Radio access technology standards such as long term evolution (Long Term Evolution, LTE) or LTE-Advanced (LTE-Advanced, LTE-A) are all established based on multiple-input multiple-output (Multiple-Input Multiple-Output, MIMO) and orthogonal frequency division multiplexing (Orthogonal Frequency Division Multiplexing, OFDM) technologies. The MIMO technology improves a peak rate and spectrum utilization of a system by using a spatial degree of freedom that can be obtained by a multiple-antenna system. It is predicable that a more massive MIMO technology with more antenna ports will be introduced in a future 5G mobile communications system.

The massive (Massive) MIMO technology, by using a massive antenna array, can greatly improve efficiency of using a frequency band of the system and support a larger quantity of access users. Therefore, research organizations all consider massive MIMO as one of the most potential physical layer technologies in next-generation mobile communications systems.

If a fully digital array is used in the massive MIMO technology, a maximal spatial resolution and optimal multi-user multiple-input multiple-output (Multi-User Multiple-Input Multiple-Output, MU-MIMO) performance can be implemented. However, this structure requires large quantities of analog-to-digital (AD) or digital-to-analog (DA) converters and a large quantity of complete radio frequency-baseband processing channels. Therefore, both device costs and baseband processing complexity are a heavy burden.

To avoid the foregoing implementation costs and device complexity, a hybrid digital-analog beamforming technology emerges. To be specific, on a basis of conventional digital domain beamforming, one stage of beamforming is added for a radio frequency signal at a front end near an antenna system. Analog beamforming can implement rough matching between a transmit signal and a channel in a simple manner. A quantity of equivalent channels formed after analog beamforming is less than an actual antenna quantity. Therefore, quantities of subsequently required AD/DA converters and digital channels, and corresponding baseband processing complexity can all be reduced greatly. Residual interference in an analog beamforming part may be processed once again in a digital domain, so that quality of MU-MIMO transmission is ensured.

Analog beamforming is full-band transmission, and an array element in each polarization direction on a panel of each high-frequency antenna array can transmit only an analog beam in a time division multiplexing mode. A beamforming weight of the analog beam is implemented by adjusting a parameter of a device such as a radio frequency front-end phase shifter. Currently, analog beamforming vector training is generally performed in a polling mode. To be specific, an array element in each polarization direction on each antenna panel sends a training signal (that is, a candidate beamforming vector) in the time division multiplexing mode in sequence at an agreed time, and a terminal feeds back a beam report after performing measurement, so that when a network-side device performs service transmission next time, the network-side device implements analog beam transmission by using the beamforming vector used by the training signal.

The network-side device configures setting information of beam reporting (beam reporting), that is, reporting setting, for the terminal by using higher layer signaling, where the setting information includes content information of beam reporting, a time domain related information (periodic, aperiodic, or semi-persistent) of beam reporting, frequency granularity (frequency granularity) information of beam reporting, and the like. The content information of beam reporting may include identifier information of at least one optimal transmit beam selected by the terminal, a physical layer measurement result of the beam selected by the terminal, grouping information of the beam selected by the terminal, and the like.

In the related art, using reporting of a beam report as an example, for periodic and semi-persistent beam reporting, once the network-side device configures related information of beam reporting, the terminal needs to periodically report beam reports, or periodically report beam reports after receiving activation commands; for aperiodic beam reporting, the terminal also needs to report one or more beam reports based on triggering by the network-side device.

However, when there are no or few changes in a beam measurement result of the terminal, that is, when there are no or few changes between a beam report currently obtained through measurement and a beam report already reported, reporting of a beam report by the terminal again may cause waste of communication resources. For example, when a state of the terminal does not change (for example, being stationary) or changes very slightly (for example, at a very low moving speed), it is possible that there are no between the beam report currently obtained through measurement and the beam report already reported. In this case, reporting of a beam report by the terminal again may cause waste of communication resources. Likewise, for reporting of a channel state information (Channel State Information, CSI) report, the same problem also exists.

SUMMARY

Embodiments of the present disclosure provide an information processing method and apparatus, a terminal, and a communications device, to resolve a problem that reporting of a beam report or a CSI report by a terminal causes waste of communication resources when there are no or few changes between a beam report currently obtained by the terminal through measurement and a beam report already reported or when there are no or few changes between a CSI report currently obtained by the terminal through measurement and a CSI report already reported.

According to a first aspect, an embodiment of the present disclosure provides an information processing method, applied to a terminal and including:

determining, based on detection of a reporting trigger event, whether to report an event-based beam report and/or an event-based channel state information CSI report to a network-side device.

According to a second aspect, an embodiment of the present disclosure further provides an information processing method, applied to a network-side device and including:

receiving an event-based beam report and/or an event-based CSI report reported by a terminal.

According to a third aspect, an embodiment of the present disclosure further provides a terminal, including:

a reporting module, configured to determine, based on detection of a reporting trigger event, whether to report an event-based beam report and/or an event-based channel state information CSI report to a network-side device.

According to a fourth aspect, an embodiment of the present disclosure further provides an information processing apparatus, including:

a receiving module, configured to receive an event-based beam report and/or an event-based CSI report reported by a terminal.

According to a fifth aspect, an embodiment of the present disclosure further provides a communications device, including a memory, a processor, and a program stored in the memory and capable of running on the processor, where when the program is executed by the processor, the steps of the information processing method according to the first aspect are implemented, or the steps of the information processing method according to the second aspect are implemented.

According to a sixth aspect, an embodiment of the present disclosure further provides a computer-readable storage medium, where the computer-readable storage medium stores a program, and when the program is executed by a processor, the steps of the information processing method according to the first aspect are implemented, or the steps of the information processing method according to the second aspect are implemented.

Therefore, in the embodiments of the present disclosure, the terminal determines, based on detection of the reporting trigger event, whether to report the event-based beam report and/or the event-based CSI report to the network-side device. Therefore, communication resources can be saved.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
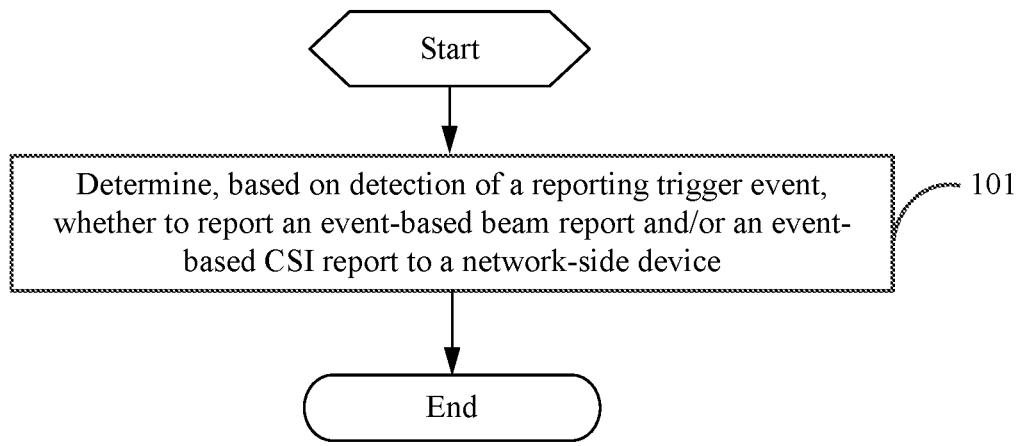
FIG. 1 is a first flowchart of an information processing method according to an embodiment of the present disclosure.

The following clearly describes the technical solutions in the embodiments of the present disclosure with reference to the accompanying drawings in the embodiments of the present disclosure. Apparently, the described embodiments are merely a part rather than all of the embodiments of the present disclosure. All other embodiments that a person of ordinary skill in the art obtains without creative efforts based on the embodiments of the present disclosure shall fall within the protection scope of the present disclosure. In addition, the term "and/or" used in this specification and claims indicates at least one of the connected objects. For example, "A and/or B" represents the following three cases: only A, only B, and both A and B.

Research on next-generation communications systems after 4G increases operating frequency bands supported by the systems to above 6 GHz, with a highest band around 100 GHz. A high frequency band includes plenty of idle frequency resources, and may provide a higher throughput for data transmission. Currently, the 3GPP has completed high frequency channel modeling. Because a wavelength of a high frequency signal is short, in comparison with a low frequency band, more antenna array elements can be arranged on a panel of a same size, and a narrow beam with high directivity is formed by using a beamforming technology. Therefore, combining massive antennas with high frequency communication is one of future trends.

With respect to beam measurement and beam reporting (beam measurement and beam reporting), analog beamforming is full-band transmission, and an array element in each polarization direction on a panel of each high-frequency antenna array can transmit only an analog beam in a time division multiplexing mode. A beamforming weight of the analog beam is implemented by adjusting a parameter of a device such as a radio frequency front-end phase shifter.

Currently, in academic circles and industrial circles, analog beamforming vector training is generally performed in a polling mode. To be specific, an array element in each polarization direction on each antenna panel sends a training signal (that is, a candidate beamforming vector) in the time division multiplexing mode in sequence at an agreed time, and a terminal feeds back a beam report after performing measurement, so that when a network side performs service transmission next time, the network side implements analog beam transmission by using the beamforming vector used by the training signal. Content of beam reporting generally includes identifiers of several optimal transmit beams and measured received power of each transmit beam.

A network-side device configures setting information of beam reporting (beam reporting), that is, reporting setting, for the terminal by using higher layer signaling, where the setting information includes content information of beam reporting, a time domain related information (periodic, aperiodic, or semi-persistent) of beam reporting, frequency granularity (frequency granularity) information of beam reporting, and the like. The content information of beam reporting may include identifier information of at least one optimal transmit beam selected by the terminal, a physical layer measurement result of the beam selected by the terminal, grouping information of the beam selected by the terminal, and the like. Details are as follows:

Channel state information (Channel State Information, CSI) may include a channel quality indicator (Channel Quality Indicator, CQI), a precoding matrix indicator (Precoding Matrix Indicator, PMI), a channel state information reference signal resource indicator (Channel State Information Reference Signal resource indicator, CSI-RS resource indicator or CRI), a layer indicator (LI), a rank indicator (RI), and layer 1-reference signal received power (L1-RSRP). Different CSI information needs to be reported for beam reporting and CSI reporting.

Each piece of setting information (higher-layer parameter CSI-ReportConfig) is associated with a downlink bandwidth part (Bandwidth part, BWP), and includes a series of reporting parameters, such as a CSI type (CSI Type) (I or II), a codebook configuration (including a codebook subset restriction (codebook subset restriction)), a time domain behavior, frequency granularities of CQI and PMI, measurement restriction configurations (measurement restriction configurations), an LI, an L1-RSRP parameter, a CSI-RS resource indicator (CSI-RS Resource Indicator, CRI), an SSB resource indicator (SSB Resource Indicator, SSBRI), and the like.

The time domain behavior in CSI-ReportConfig is indicated by radio resource control (Radio Resource Control, RRC) signaling reportConfigType, and this parameter may be set to periodic (periodic), semi-persistent (semi-persistent), or aperiodic (aperiodic). For periodic and semi-persistent CSI reporting, configured periodicity values and slot offsets (slot offset) are numerology (numerology) configured for a current active uplink bandwidth part (active UL BWP). A higher-layer parameter ReportQuantity indicates a CSI-related (CSI-related) or L1-RSRP-related (L1-RSRP-related) parameter used for reporting. A parameter ReportFreqConfiguration indicates a frequency granularity of reporting, including whether a CSI reporting band and PMI/CQI reporting (reporting) are in wideband or sub-band. The parameter CSI-ReportConfig may further include timeRestrictionForChannelMeasurements (configuration of a time domain restriction for enabling channel measurement) and timeRestrictionForInterferenceMeasurements (configuration of a time domain restriction for enabling interference measurement). CSI-ReportConfig may further include CodebookConfig, including a configuration parameter of Type-I or Type II CSI (including the codebook subset restriction) and a configuration of group based reporting (group based reporting).

For beam reporting, a configuration value of ReportQuantity needs to be set to "CRI/RSRP" or "SSBRI/RSRP", indicating that the terminal obtains L1-RSRP of each beam by measuring a CSI-RS or SSB resource configured by the network-side device and reports the L1-RSRP to the network-side device.

For periodic beam reporting, a periodicity, a slot offset, and a symbol in a slot of reporting are configured by using RRC. The terminal feeds back a beam report based on RRC configuration information, where the beam report is transmitted on a short (short) or long (long) physical uplink control channel (Physical Uplink Control Channel, PUCCH).

For semi-persistent beam reporting, a periodicity, a slot offset, and a symbol in a slot of reporting are configured by using RRC. A semi-persistent report sent by using a short/long PUCCH is activated/deactivated by using a media access control (Media Access Control, MAC) control element (Control Element, CE). A semi-persistent report sent by using a physical uplink shared channel (Physical Uplink Shared Channel, PUSCH) is activated/deactivated by using downlink control information (Downlink Control Information, DCI).

For aperiodic beam reporting, a slot offset, and a symbol in a slot of reporting are configured by using RRC, and aperiodic beam reporting is then triggered by using DCI. During triggering, the terminal may be triggered to feed back reports of a plurality of component carriers (Component Carrier, CC) or a plurality of types of reports (a beam report and a CSI report). An aperiodic beam report is transmitted on a PUSCH.

In the related art, for periodic and semi-persistent beam reporting, if the network-side device configures related information of reporting, the terminal needs to perform periodic reporting (a semi-persistent beam report is periodically reported after being activated by using a MAC CE); for aperiodic beam reporting, the terminal may also report one or more reports based on triggering by the network-side device. However, when there are no or few changes in a beam measurement result of the terminal, that is, when there are no or few changes between a beam report currently obtained through measurement and a beam report already reported, for example, when a status of the terminal does not change (for example, stationary) or changes very slightly (for example, a moving speed is very low), it is possible that the beam measurement result of the terminal does not change. In this case, reporting of a beam report by the terminal again may cause resource waste and is disadvantageous for power saving of the terminal.

To resolve the foregoing problem, an embodiment of the present disclosure provides an information processing method. A terminal determines, based on detection of a reporting trigger event, whether to report a report to a network-side device. Therefore, overheads can be reduced, and communication resources can be saved. In this embodiment of the present disclosure, the reported report may be an event-based beam report, or may be an event-based CSI report, or may be an event-based beam report and an event-based CSI report.

It should be noted that the solutions of the embodiments of the present disclosure may be not only applied to 4G and next-generation communications system, but also applied to a future communications system with development of technologies. The following describes implementation processes of the embodiments of the present disclosure in detail with reference to specific embodiments.

FIG. 1 is a flowchart of an information processing method according to an embodiment of the present disclosure. As shown in FIG. 1, the method includes the following steps.

Step 101: Determine, based on detection of a reporting trigger event, whether to report an event-based beam report and/or an event-based CSI report to a network-side device.

In this embodiment of the present disclosure, the reporting trigger event may be preset, or configured by the network-side device, or determined by a terminal. Herein, the event-based beam report or the event-based CSI report may be understood as a beam report or CSI report reported when occurrence of a reporting trigger event is detected. To be specific, the beam report or the CSI report herein is associated with detection of the reporting trigger event.

Reporting trigger events may be classified into a plurality of types. When the reporting trigger event occurs, the terminal may select to report the event-based beam report and/or the event-based CSI report, or stop reporting the event-based beam report and/or the event-based CSI report. In this step, when the reporting trigger event occurs, the terminal may report the event-based beam report and/or the event-based CSI report to the network-side device, or stop reporting the event-based beam report and/or the event-based CSI report to the network-side device.

For example, when an optimal beam identifier (a CRI or an SSBRI) that needs to be reported changes, the terminal performs reporting, or else, stops reporting. For another example, when a change of L1-RSRP corresponding to the beam identifier that needs to be reported reaches a preset threshold, the terminal performs reporting, or else, stops reporting.

In this embodiment of the present disclosure, the method may be applied to a terminal, for example, a mobile phone, a tablet computer (Tablet Personal Computer), a laptop computer (Laptop Computer), a personal digital assistant (personal digital assistant, PDA), a mobile Internet device (Mobile Internet Device, MID), or a wearable device (Wearable Device).

As can be seen from above, the terminal determines, based on detection of the reporting trigger event, whether to report the event-based beam report and/or the event-based CSI report to the network-side device. Therefore, communication resources can be saved.

In an actual application, the network-side device may further notify the terminal of whether event-based reporting is enabled. To be specific, the terminal determines, based on the notification of the network-side device and whether a reporting trigger event occurs, whether to report an event-based beam report and/or an event-based CSI report.

In this case, before step 101, the method may further include:

receiving first information from the network-side device, where the first information is used to indicate whether event-based reporting is enabled.

Specifically, the terminal may receive the first information from the network-side device in any one of the following manners:

receiving the first information from the network-side device through DCI; or receiving the first information from the network-side device through a MAC CE; or receiving the first information from the network-side device through RRC.

The foregoing signaling may be 1 bit. For example, 1 indicates ON, that is, enabling event-based reporting; 0 indicates OFF, that is, disabling event-based reporting.

In this case, step 101 is specifically: in a case that the first information is used to indicate that event-based reporting is enabled, when the reporting trigger event occurs, reporting the event-based beam report and/or the event-based CSI report to the network-side device, or stopping reporting the event-based beam report and/or the event-based CSI report to the network-side device; or in a case that the first information is used to indicate that event-based reporting is disabled, reporting a beam report and/or a CSI report to the network-side device.

For example, when the first information indicates that event-based reporting is enabled, when an optimal beam identifier (a CRI or an SSBRI) that needs to be reported changes, the terminal performs reporting, or else, stops reporting. For another example, when the first information indicates that event-based reporting is enabled, when a change of L1-RSRP corresponding to the beam identifier that needs to be reported reaches a preset threshold, the terminal performs reporting, or else, stops reporting. When the first information indicates that event-based reporting is disabled, the terminal performs reporting based on information configured by the network-side device.

In an actual application, the terminal may send a report to the network-side device based on an uplink physical channel resource configured by network higher layer signaling or agreed by a protocol or an uplink MAC command (a command agreed by a MAC layer protocol). Specifically, when the terminal reports the event-based beam report and/or the event-based CSI report to the network-side device, the terminal may perform reporting in any one of the following manners:

(1) reporting the event-based beam report and/or the event-based CSI report to the network-side device by using a PUCCH;

(2) reporting the event-based beam report and/or the event-based CSI report to the network-side device by using a semi-persistent scheduling PUSCH; or (3) reporting the event-based beam report and/or the event-based CSI report to the network-side device by using a MAC CE.

To be specific, in an actual application, the terminal may report the event-based beam report to the network-side device in any one of the foregoing manners, or report the event-based CSI report to the network-side device in any one of the foregoing manners, or report the event-based beam report and the event-based CSI report to the network-side device in any one of the foregoing manners.

The event-based beam report includes an event-based periodic beam report, or an event-based semi-persistent beam report, or an event-based aperiodic beam report; and the event-based CSI report includes an event-based periodic CSI report, or an event-based semi-persistent CSI report, or an event-based aperiodic CSI report.

In the case of manner (1), the PUCCH may be a periodic PUCCH resource or a semi-persistent PUCCH resource. In addition, in this case, when the PUCCH reporting the event-based beam report and/or the event-based CSI report collides with a PUSCH (that is, resource overlapping occurs), an uplink channel of a higher priority in the PUCCH and the PUSCH is preferentially sent. For example, if a priority of the PUCCH reporting the event-based beam report is higher than a priority of the PUSCH, the terminal preferentially sends the PUCCH reporting the event-based beam report, and defers sending of the PUSCH to a next sending time for sending.

To further save resources, in this case, a plurality of reports may be further associated with a same PUCCH, that is, a plurality of reports are sent by using the PUCCH.

Specifically, when the event-based beam report is reported to the network-side device by using the PUCCH, the event-based beam report is a plurality of event-based beam reports configured by the network-side device by using RRC or triggered by the network-side device by using DCI; when the event-based CSI report is reported to the network-side device by using the PUCCH, the event-based CSI report is a plurality of event-based CSI reports configured by the network-side device by using RRC or triggered by the network-side device by using DCI; or when the event-based beam report and the event-based CSI report are reported to the network-side device by using the PUCCH, the event-based beam report and the event-based CSI report are one or more event-based beam reports and one or more event-based CSI reports configured by the network-side device by using RRC or triggered by the network-side device by using DCI.

To be specific, the plurality of reports may be a plurality of event-based beam reports configured by the network-side device by using RRC or triggered by the network-side device by using DCI, or the plurality of reports may be a plurality of event-based CSI reports configured by the network-side device by using RRC or triggered by the network-side device by using DCI; or the plurality of reports may be one or more event-based beam reports and one or more event-based CSI reports configured by the network-side device by using RRC or triggered by the network-side device by using DCI.

To be specific, the event-based beam report and/or the event-based CSI report may be associated with a same PUCCH based on an RRC configuration, or a plurality of event-based beam reports and/or event-based CSI reports may be associated with a same PUCCH based on triggering by DCI. In other words, when the terminal reports a plurality of reports, the reported reports may be event-based beam reports, or may be event-based CSI reports, or may include both event-based beam reports and event-based CSI reports. In addition, the network-side device may trigger, by using one or more RRC configurations or using one or more pieces of DCI, which reports may be associated with a same PUCCH.

The plurality of event-based beam reports may be any one or more of an event-based periodic beam report, an event-based semi-persistent beam report, and an event-based aperiodic beam report; and the plurality of event-based CSI reports may be any one or more of an event-based periodic CSI report, an event-based semi-persistent CSI report, and an event-based aperiodic CSI report.

In addition, the terminal may further determine whether each event-based beam report and/or CSI report associated with the same PUCCH need/needs to be reported, and then multiplex the reports that need to be reported, to the PUCCH for sending to the network-side device.

Specifically, the terminal determines, from the plurality of event-based beam reports and/or the plurality of event-based CSI reports, a to-be-reported event-based beam report and/or a to-be-reported event-based CSI report; and then reports the to-be-reported event-based beam report and/or the to-be-reported event-based CSI report to the network-side device by using the PUCCH. The to-be-reported event-based beam report is any one or more of an event-based periodic beam report, an event-based semi-persistent beam report, and an event-based aperiodic beam report; and the to-be-reported event-based CSI report is any one or more of an event-based periodic CSI report, an event-based semi-persistent CSI report, and an event-based aperiodic CSI report.

In addition, in the manner (1), the following steps may further be included:

when the event-based beam report is a plurality of beam reports, sending uplink control information UCI to the network-side device, where the UCI includes first indication information, and the first indication information is used to indicate information about an event-based beam report reported to the network-side device;

when the event-based CSI report is a plurality of CSI reports, sending UCI to the network-side device, where the UCI includes second indication information, and the second indication information is used to indicate information about an event-based CSI report reported to the network-side device; and when reporting the event-based beam report and the event-based CSI report to the network-side device, and when the event-based beam report is one or more beam reports and the event-based CSI report is one or more CSI reports, sending UCI to the network-side device, where the UCI includes third indication information, and the third indication information is used to indicate information about an event-based beam report and information about an event-based CSI report reported to the network-side device.

To be specific, the terminal adds a signaling bit to the UCI, for indicating which reports are currently reported.

For example, the first indication information is a first bitmap; and when a first bit in the first bitmap is a first preset value, it indicates that a report corresponding to the first bit has been reported to the network-side device; or when a first bit in the first bitmap is a second preset value, it indicates that a report corresponding to the first bit has not been reported to the network-side device. In an actual application, the first preset value and the second preset value may be set based on a requirement. For example, the first preset value may be 1, and the second preset value may be 0.

The second indication information is a second bitmap; and when a second bit in the second bitmap is a third preset value, it indicates that a report corresponding to the second bit has been reported to the network-side device; or when a second bit in the second bitmap is a fourth preset value, it indicates that a report corresponding to the second bit has not been reported to the network-side device. In an actual application, the third preset value and the fourth preset value may be set based on a requirement. For example, the third preset value may be 1, and the fourth preset value may be 0.

The third indication information is a third bitmap; and when a third bit in the third bitmap is a fifth preset value, it indicates that a report corresponding to the third bit has been reported to the network-side device; or when a third bit in the third bitmap is a sixth preset value, it indicates that a report corresponding to the third bit has not been reported to the network-side device. In an actual application, the fifth preset value and the sixth preset value may be set based on a requirement. For example, the fifth preset value may be 1, and the sixth preset value may be 0.

The first indication information is indicated by using a new signaling field in the UCI, or the first indication information is indicated by using a new signaling bit in an existing target signaling field in the UCI, or the first indication information is indicated by using an unused state (state) of an existing signaling bit in the target signaling field.

When the first indication information is indicated by using a new signaling field in the UCI, the first indication information is separately encoded, or jointly encoded with an existing signaling field in the UCI; when the first indication information is indicated by using a new signaling bit in the existing target signaling field in the UCI, the first indication information is jointly encoded with an existing signaling bit in the target signaling field; or when the first indication information is indicated by using an unused state of the existing signaling bit in the target signaling field, the first indication information is encoded in an encoding mode of the target signaling field.

The second indication information is indicated by using a new signaling field in the UCI, or the second indication information is indicated by using a new signaling bit in an existing target signaling field in the UCI, or the second indication information is indicated by using an unused state of an existing signaling bit in an existing target signaling field in the UCI.

When the second indication information is indicated by using a new signaling field in the UCI, the second indication information is separately encoded, or jointly encoded with an existing signaling field in the UCI; when the second indication information is indicated by using a new signaling bit in the existing target signaling field in the UCI, the second indication information is jointly encoded with an existing signaling bit in the target signaling field; or when the second indication information is indicated by using an unused state of the existing signaling bit in the target signaling field, the second indication information is encoded in an encoding mode of the target signaling field.

The third indication information is indicated by using a new signaling field in the UCI, or the third indication information is indicated by using a new signaling bit in an existing target signaling field in the UCI, or the third indication information is indicated by using an unused state of an existing signaling bit in an existing target signaling field in the UCI.

When the third indication information is indicated by using a new signaling field in the UCI, the third indication information is separately encoded, or jointly encoded with an existing signaling field in the UCI; when the third indication information is indicated by using a new signaling bit in the existing target signaling field in the UCI, the third indication information is jointly encoded with an existing signaling bit in the target signaling field; or when the third indication information is indicated by using an unused state of the existing signaling bit in the target signaling field, the third indication information is encoded in an encoding mode of the target signaling field.

In the related art, existing signaling fields in UCI include a scheduling request (Scheduling Request, SR), an acknowledgement or a negative acknowledgement (ACK/NACK), and a CSI report (including an RI, a PMI, a CQI, a beam measurement result, and the like). The existing target signaling fields in the UCI include but are not limited to signaling fields in a first part (part 1) of the CSI report.

Using the first indication information as an example, a signaling field may be added to the UCI, and the first indication information is indicated by using the new signaling field. It is assumed that UCI information carried in a PUCCH format 1 (PUCCH format 1) is an ACK/NACK, and a length is 2 bits. Herein, a signaling field is added and its length is N (N is a positive integer). In this case, the UCI carries two signaling fields, that is, the new signaling field and an ACK/NACK signaling field. In this case, the new signaling field may be separately encoded, or jointly encoded with the existing ACK/NACK signaling field.

Alternatively, the first signaling field is indicated by using the new signaling bit in the existing target signaling field in the UCI. For example, if the target signaling field is ACK/NACK, M (M is a positive integer) bits may be added to the ACK/NACK signaling field. In this case, a length of the ACK/NACK signaling field is M+2 bits. In this case, the added M bits are jointly encoded with the existing 2-bit ACK/NACK.

Using the first bitmap as an example, a quantity of bits in the first bitmap is equal to a quantity of reports, each bit corresponds to a report index (for example, indicated by using a CC index) in sequence, and the correspondence may be in a default index sequence or a sequence configured by the network. Each bit being 1 indicates that a report corresponding to the bit is reported. Each bit being 0 indicates that no report corresponding to the bit is reported. The new signaling bit may be placed out of the CSI report in the UCI or the new signaling bit is placed in the part 1 of the CSI report. The new signaling bit may be separately encoded and then jointly sent with other UCI content to the network-side device. Alternatively, the new signaling bit is jointly encoded with other UCI signaling, for example, jointly encoded with the CSI report.

In the manner (2) and the manner (3), if the event-based beam report and/or event-based CSI report reported by the terminal are/is a plurality of reports, for the processing manner of the terminal, refer to the processing manner of the terminal in the manner (1).

If the terminal does not provide the foregoing indication, the network-side device performs blind detection for the event-based beam report and/or the event-based CSI report reported by the terminal to determine an event-based beam report actually reported by the terminal and/or an event-based CSI report actually reported by the terminal.

As can be seen from above, in this embodiment of the present disclosure, when there are few changes in a measurement result, the terminal does not need to report a beam report and/or a CSI report. Therefore, resource overheads can be reduced, and this is advantageous for power saving of the terminal.

Figure 2:
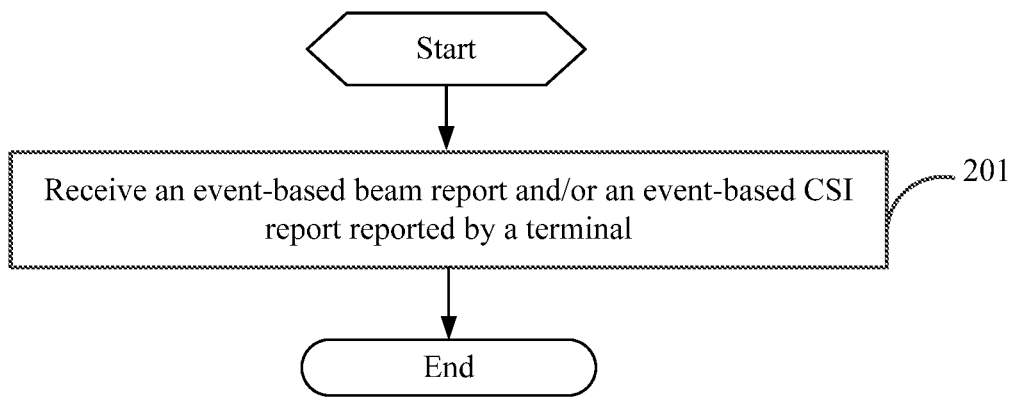
FIG. 2 is a second flowchart of an information processing method according to an embodiment of the present disclosure.

FIG. 2 is a flowchart of an information processing method according to an embodiment of the present disclosure, where the method is applied to a network-side device. As shown in FIG. 2, the method includes the following steps.

Step 201: Receive an event-based beam report and/or an event-based CSI report reported by a terminal.

Specifically, the network-side device may receive the event-based beam report and/or the event-based CSI report reported by the terminal by using a PUCCH; or receive the event-based beam report and/or the event-based CSI report reported by the terminal by using a semi-persistent scheduling PUSCH; or receive the event-based beam report and/or the event-based CSI report reported by the terminal by using a MAC CE.

As can be seen from above, the terminal determines, based on detection of a reporting trigger event, whether to report the event-based beam report and/or the event-based CSI report to the network-side device. Therefore, communication resources can be saved.

To improve reporting efficiency and further save resources, before step 201, the method further includes: sending first information to the terminal, where the first information is used to indicate whether event-based reporting is enabled.

Specifically, the network-side device may send the first information to the terminal in the following manner: sending the first information to the terminal by using DCI; or sending the first information to the terminal by using a MAC CE; or sending the first information to the terminal by using RRC.

To further save resources, when the event-based beam report is a plurality of event-based beam reports configured by the network-side device by using RRC or triggered by the network-side device by using DCI, and/or when the event-based CSI report is a plurality of event-based CSI reports configured by the network-side device by using RRC or triggered by the network-side device by using DCI, the method further includes:

the network-side device receives UCI from the terminal, and determines, based on the UCI, an event-based beam report actually reported by the terminal and/or an event-based CSI report actually reported by the terminal, where the UCI includes at least one of the following information: first indication information, where the first indication information is used to indicate information about an event-based beam report reported by the terminal to the network-side device; second indication information, where the second indication information is used to indicate information about an event-based CSI report reported by the terminal to the network-side device; and third indication information, where the third indication information is used to indicate information about an event-based beam report and an event-based CSI report reported by the terminal to the network-side device.

To further save resources, the method further includes: the network-side device performs blind detection for the event-based beam report and/or the event-based CSI report reported by the terminal to determine an event-based beam report actually reported by the terminal and/or an event-based CSI report actually reported by the terminal.

As can be seen from above, in this embodiment of the present disclosure, when there are few changes in a measurement result, the terminal does not need to report a beam report and/or a CSI report. Therefore, resource overheads can be reduced, and this is advantageous for power saving of the terminal.

Figure 3:
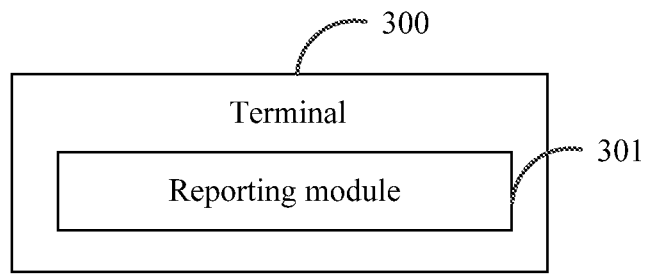
FIG. 3 is a first structural diagram of a terminal according to an embodiment of the present disclosure.

FIG. 3 is a structural diagram of a terminal according to an embodiment of the present disclosure. As shown in FIG. 3, the terminal 300 includes:

a reporting module 301, configured to determine, based on detection of a reporting trigger event, whether to report an event-based beam report and/or an event-based channel state information CSI report to a network-side device.

The reporting module 301 is configured to: when the reporting trigger event occurs, report the event-based beam report and/or the event-based CSI report to the network-side device, or stop reporting the event-based beam report and/or the event-based CSI report to the network-side device.

Optionally, the terminal may further include a first receiving module, configured to receive first information from the network-side device, where the first information is used to indicate whether event-based reporting is enabled. In this case, the reporting module 301 is specifically configured to: in a case that the first information is used to indicate that event-based reporting is enabled, when the reporting trigger event occurs, report the event-based beam report and/or the event-based CSI report to the network-side device, or stop reporting the event-based beam report and/or the event-based CSI report to the network-side device; or in a case that the first information is used to indicate that event-based reporting is disabled, report a beam report and/or a CSI report to the network-side device.

Optionally, the first receiving module is configured to receive the first information from the network-side device through DCI; or receive the first information from the network-side device through a MAC CE; or receive the first information from the network-side device through RRC.

Optionally, when reporting the event-based beam report and/or the event-based CSI report to the network-side device, the reporting module reports the event-based beam report and/or the event-based CSI report to the network-side device by using a PUCCH; or reports the event-based beam report and/or the event-based CSI report to the network-side device by using a semi-persistent scheduling PUSCH; or reports the event-based beam report and/or the event-based CSI report to the network-side device by using a MAC CE. In a case that the PUCCH collides with a PUSCH, the reporting module preferentially sends a higher-priority one of the PUCCH and the PUSCH.

The event-based beam report includes an event-based periodic beam report, or an event-based semi-persistent beam report, or an event-based aperiodic beam report; and the event-based CSI report includes an event-based periodic CSI report, or an event-based semi-persistent CSI report, or an event-based aperiodic CSI report.

When the event-based beam report is reported to the network-side device by using the PUCCH, the event-based beam report is a plurality of event-based beam reports configured by the network-side device by using RRC or triggered by the network-side device by using DCI; when the event-based CSI report is reported to the network-side device by using the PUCCH, the event-based CSI report is a plurality of event-based CSI reports configured by the network-side device by using RRC or triggered by the network-side device by using DCI; or when the event-based beam report and the event-based CSI report are reported to the network-side device by using the PUCCH, the event-based beam report and the event-based CSI report are one or more event-based beam reports and one or more event-based CSI reports configured by the network-side device by using RRC or triggered by the network-side device by using DCI.

In this case, the terminal may further include a determining module, configured to determine, from the plurality of event-based beam reports and/or the plurality of event-based CSI reports, a to-be-reported event-based beam report and/or a to-be-reported event-based CSI report. In this case, the reporting module is configured to report the to-be-reported event-based beam report and/or the to-be-reported event-based CSI report to the network-side device by using the PUCCH.

The to-be-reported event-based beam report is any one or more of an event-based periodic beam report, an event-based semi-persistent beam report, and an event-based aperiodic beam report; and the to-be-reported event-based CSI report is any one or more of an event-based periodic CSI report, an event-based semi-persistent CSI report, and an event-based aperiodic CSI report.

When reporting the event-based beam report and/or the event-based CSI report to the network-side device by using the physical uplink control channel PUCCH, the terminal may further include a sending module, configured to: when the event-based beam report is a plurality of beam reports, send uplink control information UCI to the network-side device, where the UCI includes first indication information, and the first indication information is used to indicate information about an event-based beam report reported to the network-side device; when the event-based CSI report is a plurality of CSI reports, send UCI to the network-side device, where the UCI includes second indication information, and the second indication information is used to indicate information about an event-based CSI report reported to the network-side device; and when reporting the event-based beam report and the event-based CSI report to the network-side device, and when the event-based beam report is one or more beam reports and the event-based CSI report is one or more CSI reports, send UCI to the network-side device, where the UCI includes third indication information, and the third indication information is used to indicate information about an event-based beam report and information about an event-based CSI report reported to the network-side device.

The first indication information is a first bitmap bitmap; and when a first bit in the first bitmap is a first preset value, it indicates that a report corresponding to the first bit has been reported to the network-side device; or when a first bit in the first bitmap is a second preset value, it indicates that a report corresponding to the first bit has not been reported to the network-side device. The second indication information is a second bitmap bitmap; and when a second bit in the second bitmap is a third preset value, it indicates that a report corresponding to the second bit has been reported to the network-side device; or when a second bit in the second bitmap is a fourth preset value, it indicates that a report corresponding to the second bit has not been reported to the network-side device. The third indication information is a third bitmap bitmap; and when a third bit in the third bitmap is a fifth preset value, it indicates that a report corresponding to the third bit has been reported to the network-side device; or when a third bit in the third bitmap is a sixth preset value, it indicates that a report corresponding to the third bit has not been reported to the network-side device.

The first indication information is indicated by using a new signaling field in the UCI, or the first indication information is indicated by using a new signaling bit in an existing target signaling field in the UCI, or the first indication information is indicated by using an unused state of an existing signaling bit in an existing target signaling field in the UCI.

The second indication information is indicated by using a new signaling field in the UCI, or the second indication information is indicated by using a new signaling bit in an existing target signaling field in the UCI, or the second indication information is indicated by using an unused state of an existing signaling bit in an existing target signaling field in the UCI.

The third indication information is indicated by using a new signaling field in the UCI, or the third indication information is indicated by using a new signaling bit in an existing target signaling field in the UCI, or the third indication information is indicated by using an unused state of an existing signaling bit in an existing target signaling field in the UCI.

When the first indication information is indicated by using a new signaling field in the UCI, the first indication information is separately encoded, or jointly encoded with an existing signaling field in the UCI; when the first indication information is indicated by using a new signaling bit in the existing target signaling field in the UCI, the first indication information is jointly encoded with an existing signaling bit in the target signaling field; or when the first indication information is indicated by using an unused state of the existing signaling bit in the target signaling field, the first indication information is encoded in an encoding mode of the target signaling field.

When the second indication information is indicated by using a new signaling field in the UCI, the second indication information is separately encoded, or jointly encoded with an existing signaling field in the UCI; when the second indication information is indicated by using a new signaling bit in the existing target signaling field in the UCI, the second indication information is jointly encoded with an existing signaling bit in the target signaling field; or when the second indication information is indicated by using an unused state of the existing signaling bit in the target signaling field, the second indication information is encoded in an encoding mode of the target signaling field.

When the third indication information is indicated by using a new signaling field in the UCI, the third indication information is separately encoded, or jointly encoded with an existing signaling field in the UCI; when the third indication information is indicated by using a new signaling bit in the existing target signaling field in the UCI, the third indication information is jointly encoded with an existing signaling bit in the target signaling field; or when the third indication information is indicated by using an unused state of the existing signaling bit in the target signaling field, the third indication information is encoded in an encoding mode of the target signaling field.

The terminal 300 can implement each process implemented by the terminal in the embodiments shown in FIG. 1 and FIG. 2. To avoid repetition, details are not described again herein.

As can be seen from above, the terminal determines, based on detection of the reporting trigger event, whether to report the event-based beam report and/or the event-based CSI report to the network-side device. Therefore, communication resources can be saved.

Figure 4:
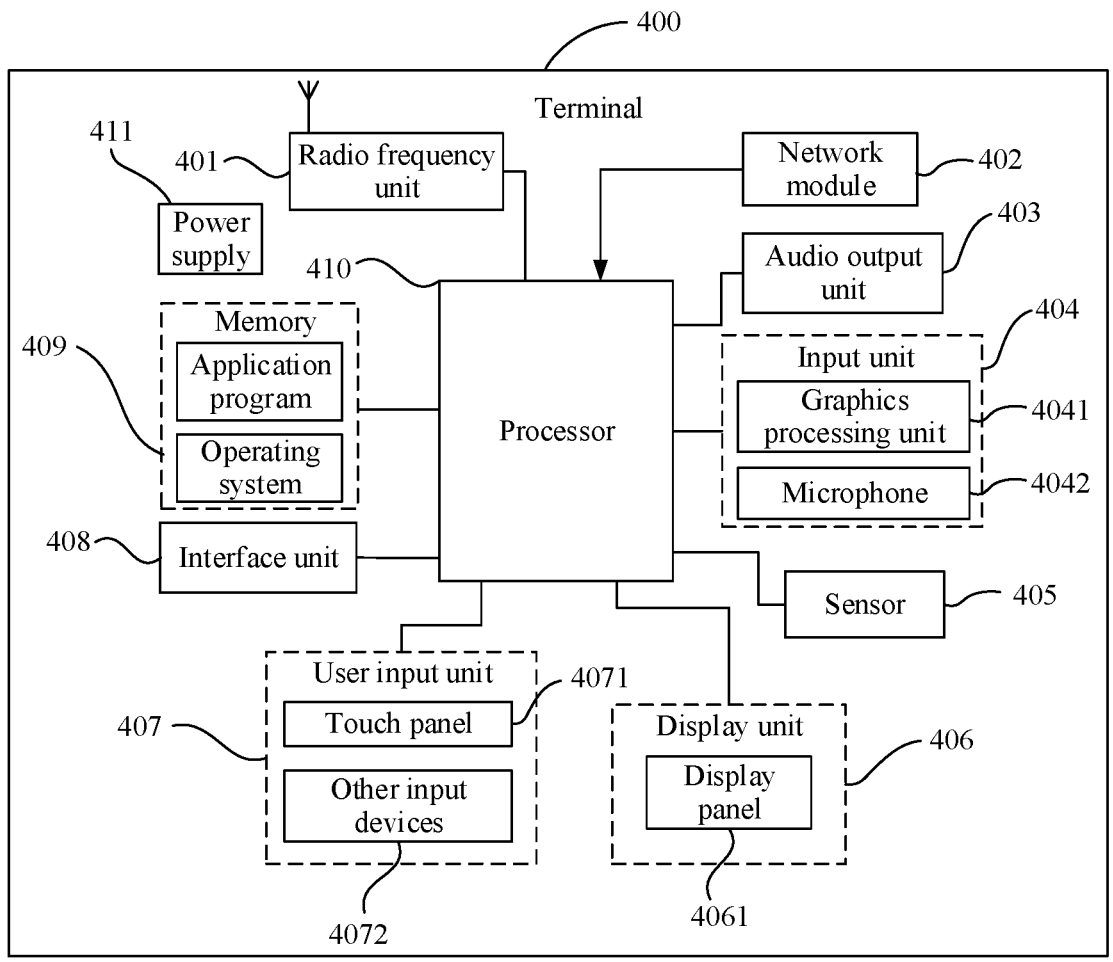
FIG. 4 is a second structural diagram of a terminal according to an embodiment of the present disclosure.

FIG. 4 is a schematic diagram of a hardware structure of a terminal for implementing each embodiment of the present disclosure. The terminal 400 includes but is not limited to components such as a radio frequency unit 401, a network module 402, an audio output unit 403, an input unit 404, a sensor 405, a display unit 406, a user input unit 407, an interface unit 408, a memory 409, a processor 410, and a power supply 411. A person skilled in the art may understand that the structure of the terminal shown in FIG. 4 does not constitute a limitation on the terminal. A quantity of components included in the terminal may be greater or less than that shown in the figure, or some components are combined, or component arrangements are different. In this embodiment of the present disclosure, the terminal includes but is not limited to a mobile phone, a tablet computer, a notebook computer, a palmtop computer, an in-vehicle terminal, a wearable device, a pedometer, or the like.

The processor 410 is configured to determine, based on detection of a reporting trigger event, whether to report an event-based beam report and/or an event-based channel state information CSI report to a network-side device.

As can be seen from above, the terminal determines, based on detection of the reporting trigger event, whether to report the event-based beam report and/or the event-based CSI report to the network-side device. Therefore, communication resources can be saved.

The processor 410 is configured to: when the reporting trigger event occurs, report the event-based beam report and/or the event-based CSI report to the network-side device, or stop reporting the event-based beam report and/or the event-based CSI report to the network-side device.

The processor 410 is configured to receive first information from the network-side device, where the first information is used to indicate whether event-based reporting is enabled.

The processor 410 is configured to: in a case that the first information is used to indicate that event-based reporting is enabled, when the reporting trigger event occurs, report the event-based beam report and/or the event-based CSI report to the network-side device, or stop reporting the event-based beam report and/or the event-based CSI report to the network-side device; or in a case that the first information is used to indicate that event-based reporting is disabled, report a beam report and/or a CSI report to the network-side device.

The processor 410 is configured to receive the first information from the network-side device through downlink control information DCI; or receive the first information from the network-side device through a media access control MAC control element CE; or receive the first information from the network-side device through radio resource control RRC.

The processor 410 is configured to report the event-based beam report and/or the event-based CSI report to the network-side device by using a physical uplink control channel PUCCH; or report the event-based beam report and/or the event-based CSI report to the network-side device by using a semi-persistent scheduling physical uplink shared channel PUSCH; or report the event-based beam report and/or the event-based CSI report to the network-side device by using a MAC CE.

The processor 410 is configured to: in a case that the PUCCH collides with a PUSCH, preferentially send a higher-priority one of the PUCCH and the PUSCH.

The event-based beam report includes an event-based periodic beam report, or an event-based semi-persistent beam report, or an event-based aperiodic beam report; and the event-based CSI report includes an event-based periodic CSI report, or an event-based semi-persistent CSI report, or an event-based aperiodic CSI report.

When the event-based beam report is reported to the network-side device by using the PUCCH, the event-based beam report is a plurality of event-based beam reports configured by the network-side device by using RRC or triggered by the network-side device by using DCI; when the event-based CSI report is reported to the network-side device by using the PUCCH, the event-based CSI report is a plurality of event-based CSI reports configured by the network-side device by using RRC or triggered by the network-side device by using DCI; or when the event-based beam report and the event-based CSI report are reported to the network-side device by using the PUCCH, the event-based beam report and the event-based CSI report are one or more event-based beam reports and one or more event-based CSI reports configured by the network-side device by using RRC or triggered by the network-side device by using DCI.

The processor 410 is configured to determine, from the plurality of event-based beam reports and/or the plurality of event-based CSI reports, a to-be-reported event-based beam report and/or a to-be-reported event-based CSI report; and report the to-be-reported event-based beam report and/or the to-be-reported event-based CSI report to the network-side device by using the PUCCH.

The to-be-reported event-based beam report is any one or more of an event-based periodic beam report, an event-based semi-persistent beam report, and an event-based aperiodic beam report; and the to-be-reported event-based CSI report is any one or more of an event-based periodic CSI report, an event-based semi-persistent CSI report, and an event-based aperiodic CSI report.

The processor 410 is configured to: when the event-based beam report is a plurality of beam reports, send uplink control information UCI to the network-side device, where the UCI includes first indication information, and the first indication information is used to indicate information about an event-based beam report reported to the network-side device; when the event-based CSI report is a plurality of CSI reports, send UCI to the network-side device, where the UCI includes second indication information, and the second indication information is used to indicate information about an event-based CSI report reported to the network-side device; and when reporting the event-based beam report and the event-based CSI report to the network-side device, and when the event-based beam report is one or more beam reports and the event-based CSI report is one or more CSI reports, send UCI to the network-side device, where the UCI includes third indication information, and the third indication information is used to indicate information about an event-based beam report and information about an event-based CSI report reported to the network-side device.

The first indication information is a first bitmap bitmap; and when a first bit in the first bitmap is a first preset value, it indicates that a report corresponding to the first bit has been reported to the network-side device; or when a first bit in the first bitmap is a second preset value, it indicates that a report corresponding to the first bit has not been reported to the network-side device.

The second indication information is a second bitmap bitmap; and when a second bit in the second bitmap is a third preset value, it indicates that a report corresponding to the second bit has been reported to the network-side device; or when a second bit in the second bitmap is a fourth preset value, it indicates that a report corresponding to the second bit has not been reported to the network-side device.

The third indication information is a third bitmap bitmap; and when a third bit in the third bitmap is a fifth preset value, it indicates that a report corresponding to the third bit has been reported to the network-side device; or when a third bit in the third bitmap is a sixth preset value, it indicates that a report corresponding to the third bit has not been reported to the network-side device.

The first indication information is indicated by using a new signaling field in the UCI, or the first indication information is indicated by using a new signaling bit in an existing target signaling field in the UCI, or the first indication information is indicated by using an unused state of an existing signaling bit in an existing target signaling field in the UCI.

The second indication information is indicated by using a new signaling field in the UCI, or the second indication information is indicated by using a new signaling bit in an existing target signaling field in the UCI, or the second indication information is indicated by using an unused state of an existing signaling bit in an existing target signaling field in the UCI.

The third indication information is indicated by using a new signaling field in the UCI, or the third indication information is indicated by using a new signaling bit in an existing target signaling field in the UCI, or the third indication information is indicated by using an unused state of an existing signaling bit in an existing target signaling field in the UCI.

When the first indication information is indicated by using a new signaling field in the UCI, the first indication information is separately encoded, or jointly encoded with an existing signaling field in the UCI; when the first indication information is indicated by using a new signaling bit in the existing target signaling field in the UCI, the first indication information is jointly encoded with an existing signaling bit in the target signaling field; or when the first indication information is indicated by using an unused state of the existing signaling bit in the target signaling field, the first indication information is encoded in an encoding mode of the target signaling field.

When the second indication information is indicated by using a new signaling field in the UCI, the second indication information is separately encoded, or jointly encoded with an existing signaling field in the UCI; when the second indication information is indicated by using a new signaling bit in the existing target signaling field in the UCI, the second indication information is jointly encoded with an existing signaling bit in the target signaling field; or when the second indication information is indicated by using an unused state of the existing signaling bit in the target signaling field, the second indication information is encoded in an encoding mode of the target signaling field.

When the third indication information is indicated by using a new signaling field in the UCI, the third indication information is separately encoded, or jointly encoded with an existing signaling field in the UCI; when the third indication information is indicated by using a new signaling bit in the existing target signaling field in the UCI, the third indication information is jointly encoded with an existing signaling bit in the target signaling field; or when the third indication information is indicated by using an unused state of the existing signaling bit in the target signaling field, the third indication information is encoded in an encoding mode of the target signaling field.

It should be understood that in this embodiment of the present disclosure, the radio frequency unit 401 may be configured to receive and send signals in an information reception or transmission or call process. Specifically, after receiving downlink data from a base station, the radio frequency unit 401 sends the downlink data to the processor 410 for processing, and in addition, sends uplink data to the base station. Generally, the radio frequency unit 401 includes but is not limited to an antenna, at least one amplifier, a transceiver, a coupler, a low noise amplifier, a duplexer, and the like. In addition, the radio frequency unit 401 may further communicate with a network and other devices through a wireless communications system.

The terminal provides wireless broadband Internet access for a user by using the network module 402, for example, helps the user send and receive e-mails, browse web pages, and access streaming media.

The audio output unit 403 may convert audio data received by the radio frequency unit 401 or the network module 402 or stored in the memory 409 into an audio signal, and output the audio signal as a sound. In addition, the audio output unit 403 may further provide an audio output (for example, a call signal reception sound or a message reception sound) related to a specific function performed by the terminal 400. The audio output unit 403 includes a speaker, a buzzer, a telephone receiver, and the like.

The input unit 404 is configured to receive an audio or video signal. The input unit 404 may include a GPU (Graphics Processing Unit, graphics processing unit) 4041 and a microphone 4042. The graphics processing unit 4041 processes image data of a still picture or a video obtained by an image capture apparatus (for example, a camera) in an image capture mode or a video capture mode. A processed image frame may be displayed on the display unit 406. An image frame processed by the graphics processing unit 4041 may be stored in the memory 409 (or other storage media) or sent by the radio frequency unit 401 or the network module 402. The microphone 4042 can receive a sound and can process the sound into audio data. The processed audio data may be converted in a telephone call mode into a format that can be sent by the radio frequency unit 401 to a mobile communications base station, for outputting.

The terminal 400 further includes at least one sensor 405, for example, a light sensor, a motion sensor, and other sensors. Specifically, the light sensor includes an ambient light sensor and a proximity sensor. The ambient light sensor may adjust luminance of a display panel 4061 based on brightness of ambient light. The proximity sensor may turn off and/or backlight the display panel 4061 when the terminal 400 moves to an ear. As a type of motion sensor, an accelerometer sensor may detect acceleration magnitudes in all directions (generally three axes), and when the accelerometer sensor is stationary, may detect a magnitude and a direction of gravity, and may be configured for terminal posture recognition (such as switching between landscape and portrait, related games, and magnetometer posture calibration), vibration recognition related functions (such as a pedometer and stroke), and the like. The sensor 405 may further include a fingerprint sensor, a pressure sensor, an iris sensor, a molecular sensor, a gyroscope, a barometer, a hygrometer, a thermometer, an infrared sensor, and the like. Details are not described herein.

The display unit 406 is configured to display information input by the user or information provided for the user. The display unit 406 may include the display panel 4061. The display panel 4061 may be configured in a form of a liquid crystal display (Liquid Crystal Display, LCD), an organic light-emitting diode (Organic Light-Emitting Diode, OLED), or the like.

The user input unit 407 may be configured to receive input digit or character information, and generate a key signal input related to a user setting and function control of the terminal. Specifically, the user input unit 407 includes a touch panel 4071 and other input devices 4072. The touch panel 4071, also referred to as a touchscreen, may capture a touch operation performed by the user on or near the touch panel (for example, an operation performed by the user on the touch panel 4071 or near the touch panel 4071 by using any appropriate object or accessory such as a finger or a stylus). The touch panel 4071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information into point coordinates, sends the point coordinates to the processor 410, and receives and executes a command sent by the processor 410. In addition, the touch panel 4071 may be implemented in a plurality of forms, for example, a resistive, capacitive, infrared, or surface acoustic wave touch panel. The user input unit 407 may further include the other input devices 4072 in addition to the touch panel 4071. Specifically, the other input devices 4072 may include but are not limited to a physical keyboard, a function key (such as a volume control key or a power on/off key), a trackball, a mouse, a joystick, and the like. Details are not described herein.

Further, the touch panel 4071 may cover the display panel 4061. After the touch panel 4071 detects a touch operation on or near the touch panel, the touch panel 4071 transmits the touch operation to the processor 410 to determine a type of a touch event. Then the processor 410 provides a corresponding visual output on the display panel 4061 based on the type of the touch event. Although the touch panel 4071 and the display panel 4061 are used as two independent components to implement input and output functions of the terminal in FIG. 4, the touch panel 4071 and the display panel 4061 may be integrated to implement the input and output functions of the terminal in some embodiments. This is not specifically limited herein.

The interface unit 408 is an interface for connecting an external apparatus to the terminal 400. For example, the external apparatus may include a wired or wireless headphone port, an external power (or battery charger) port, a wired or wireless data port, a memory card port, a port for connecting an apparatus having an identification module, an audio input/output (I/O) port, a video I/O port, an earphone port, and the like. The interface unit 408 may be configured to receive an input (for example, data information or power) from an external apparatus, and transmit the received input to one or more components in the terminal 400, or may be configured to transmit data between the terminal 400 and an external apparatus.

The memory 409 may be configured to store a software program and various data. The memory 409 may mainly include a program storage area and a data storage area. The program storage area may store an operating system, an application program required for at least one function (such as a sound play function and an image play function), and the like. The data storage area may store data created based on use of the terminal (such as audio data and a phone book), and the like. In addition, the memory 409 may include a high-speed random access memory, or may include a non-volatile memory, for example, at least one magnetic disk storage device, a flash memory, or other non-volatile solid-state storage devices.

The processor 410 is a control center of the terminal. The processor 410 uses various interfaces and lines to connect all parts of the entire terminal, and performs various functions and data processing of the terminal by running or executing the software program and/or module stored in the memory 409 and invoking data stored in the memory 409, thereby performing overall monitoring on the terminal. The processor 410 may include one or more processing units. Optionally, the processor 410 may integrate an application processor and a modem processor. The application processor mainly processes the operating system, a user interface, an application program, and the like. The modem processor mainly processes wireless communication. It may be understood that the modem processor may alternatively not be integrated into the processor 410.

The terminal 400 may further include the power supply 411 (such as a battery) supplying power to each component. Optionally, the power supply 411 may be logically connected to the processor 410 by using a power management system, so that functions such as charge and discharge management and power consumption management are implemented by using the power management system.

In addition, the terminal 400 includes some functional modules that are not illustrated. Details are not described herein.

Figure 5:
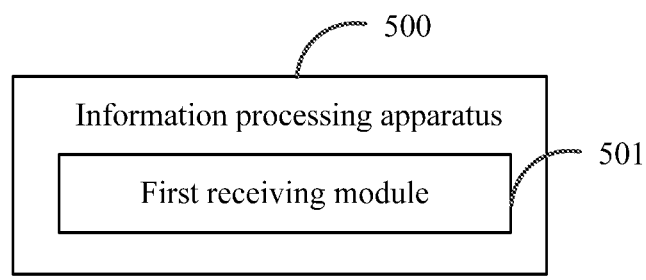
FIG. 5 is a structural diagram of an information processing apparatus according to an embodiment of the present disclosure.

As shown in FIG. 5, an information processing apparatus 500 in an embodiment of the present disclosure includes:

a first receiving module 501, configured to receive an event-based beam report and/or an event-based CSI report reported by a terminal.

Optionally, the first receiving module 501 is configured to receive the event-based beam report and/or the event-based CSI report reported by the terminal by using a PUCCH; or receive the event-based beam report and/or the event-based CSI report reported by the terminal by using a semi-persistent scheduling PUSCH; or receive the event-based beam report and/or the event-based CSI report reported by the terminal by using a MAC CE.

Optionally, the information processing apparatus 500 may further include a first sending module, configured to send first information to the terminal, where the first information is used to indicate whether event-based reporting is enabled. Specifically, the first sending module is configured to send the first information to the terminal by using DCI; or send the first information to the terminal by using a MAC CE; or send the first information to the terminal by using RRC.

Optionally, when the event-based beam report is a plurality of event-based beam reports configured by the network-side device by using RRC or triggered by the network-side device by using DCI, and/or when the event-based CSI report is a plurality of event-based CSI reports configured by the network-side device by using RRC or triggered by the network-side device by using DCI, the information processing apparatus 500 may further include: a second receiving module, configured to receive UCI from the terminal; and a determining module, configured to determine, based on the UCI, an event-based beam report actually reported by the terminal and/or an event-based CSI report actually reported by the terminal, where the UCI includes at least one of the following information: first indication information, where the first indication information is used to indicate information about an event-based beam report reported by the terminal to the network-side device; second indication information, where the second indication information is used to indicate information about an event-based CSI report reported by the terminal to the network-side device; and third indication information, where the third indication information is used to indicate information about an event-based beam report and an event-based CSI report reported by the terminal to the network-side device.

The information processing apparatus 500 may further include a detection module, configured to perform blind detection for the event-based beam report and/or the event-based CSI report reported by the terminal to determine an event-based beam report actually reported by the terminal and/or an event-based CSI report actually reported by the terminal.

The information processing apparatus 500 can implement each process implemented by the network-side device in the embodiments shown in FIG. 1 and FIG. 2. To avoid repetition, details are not described again herein.

As can be seen from above, the terminal determines, based on detection of a reporting trigger event, whether to report the event-based beam report and/or the event-based CSI report to the network-side device. Therefore, communication resources can be saved.

Optionally, an embodiment of the present disclosure further provides a communications device, including a processor, a memory, and a computer program stored in the memory and capable of running on the processor. When the computer program is executed by the processor, the procedures of any embodiment of the foregoing information processing method are implemented, and the same technical effects can be achieved. To avoid repetition, details are not described again herein.

An embodiment of the present disclosure further provides a computer-readable storage medium, where the computer-readable storage medium stores a computer program. When the computer program is executed by a processor, the procedures of any embodiment of the foregoing information processing method are implemented, and the same technical effects can be achieved. To avoid repetition, details are not described again herein. The computer-readable storage medium is, for example, a read-only memory (Read-Only Memory, ROM), a random access memory (Random Access Memory, RAM), a magnetic disk, or an optical disc.

It should be noted that in this specification, the term "comprise", "include", or any other variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element.

Based on the description of the foregoing implementations, a person skilled in the art can clearly understand that the method in the foregoing embodiments may be implemented by software in addition to a necessary universal hardware platform or by hardware only. In most cases, the former is a more preferred implementation. Based on such an understanding, the technical solutions of the present disclosure essentially, or the part contributing to the prior art may be implemented in a form of a computer software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of the present disclosure.

The embodiments of the present disclosure are described above with reference to the accompanying drawings, but the present disclosure is not limited to the embodiments. The embodiments are only illustrative rather than restrictive. Inspired by the present disclosure, a person of ordinary skill in the art can still derive a plurality of variations without departing from the essence of the present disclosure and the protection scope of the claims. All these variations shall fall within the protection of the present disclosure.

What is claimed is:

1. An information processing method, performed by a terminal and comprising:
    determining, based on detection of a reporting trigger event, whether to report at least one of an event-based beam report or an event-based channel state information (CSI) report to a network-side device,
    wherein the determining, based on detection of the reporting trigger event, whether to report at least one of the event-based beam report or the event-based channel state information (CSI) report to a network-side device comprises:
    when the reporting trigger event occurs, stopping reporting at least one of the event-based beam report or the event-based CSI report to the network-side device,
    wherein the reporting at least one of the event-based beam report or the event-based CSI report to the network-side device comprises:
        reporting at least one of the event-based beam report or the event-based CSI report to the network-side device by using a physical uplink control channel (PUCCH); or
        reporting at least one of the event-based beam report or the event-based CSI report to the network-side device by using a semi-persistent scheduling physical uplink shared channel (PUSCH); or
        reporting at least one of the event-based beam report or the event-based CSI report to the network-side device by using a media access control (MAC) control element (CE),
    wherein,
    when reporting at least one of the event-based beam report or the event-based CSI report to the network-side device by using the physical uplink control channel (PUCCH), the method further comprises:
        in a case that the PUCCH collides with a PUSCH, preferentially sending a higher-priority one of the PUCCH and the PUSCH;
    or,
    when reporting at least one of the event-based beam report or the event-based CSI report to the network-side device by using the physical uplink control channel (PUCCH), the method further comprises at least one of the following steps:
        when the event-based beam report is a plurality of beam reports, sending uplink control information (UCI) to the network-side device, wherein the UCI comprises first indication information, and the first indication information is used to indicate information about an event-based beam report reported to the network-side device;
        when the event-based CSI report is a plurality of CSI reports, sending UCI to the network-side device, wherein the UCI comprises second indication information, and the second indication information is used to indicate information about an event-based CSI report reported to the network-side device; or
        when reporting the event-based beam report and the event-based CSI report to the network-side device, and when the event-based beam report is one or more beam reports and the event-based CSI report is one or more CSI reports, sending UCI to the network-side device, wherein the UCI comprises third indication information, and the third indication information is used to indicate information about an event-based beam report and information about an event-based CSI report reported to the network-side device.

2. The method according to claim 1, wherein before the determining, based on detection of the reporting trigger event, whether to report at least one of the event-based beam report or the event-based channel state information (CSI) report to a network-side device, the method further comprises:
    receiving first information from the network-side device, wherein the first information is used to indicate whether event-based reporting is enabled.

3. The method according to claim 2, wherein the determining, based on detection of the reporting trigger event, whether to report at least one of the event-based beam report or the event-based channel state information (CSI) report to the network-side device comprises:
    in a case that the first information is used to indicate that event-based reporting is enabled, when the reporting trigger event occurs, stopping reporting at least one of the event-based beam report or the event-based CSI report to the network-side device; or
    in a case that the first information is used to indicate that event-based reporting is disabled, reporting at least one of a beam report or a CSI report to the network-side device.

4. The method according to claim 1, wherein
    when the event-based beam report is reported to the network-side device by using the PUCCH, the event-based beam report is a plurality of event-based beam reports configured by the network-side device by using radio resource control (RRC) or triggered by the network-side device by using downlink control information (DCI);
    when the event-based CSI report is reported to the network-side device by using the PUCCH, the event-based CSI report is a plurality of event-based CSI reports configured by the network-side device by using RRC or triggered by the network-side device by using DCI; or
    when the event-based beam report and the event-based CSI report are reported to the network-side device by using the PUCCH, the event-based beam report and the event-based CSI report are one or more event-based beam reports and one or more event-based CSI reports configured by the network-side device by using RRC or triggered by the network-side device by using DCI.

5. The method according to claim 4, further comprising:
    determining, from the plurality of event-based beam reports, from the plurality of event-based CSI reports, or from both the plurality of event-based beam reports and the plurality of event-based CSI reports, at least one of a to-be-reported event-based beam report or a to-be-reported event-based CSI report; and the reporting at least one of the event-based beam report or the event-based CSI report to the network-side device by using a physical uplink control channel (PUCCH) comprises:

reporting at least one of the to-be-reported event-based beam report or the to-be-reported event-based CSI report to the network-side device by using the PUCCH.

6. The method according to claim 1, wherein in a case that the UCI comprises the first indication information, the first indication information is a first bitmap; and when a first bit in the first bitmap is a first preset value, it indicates that a report corresponding to the first bit has been reported to the network-side device; or when a first bit in the first bitmap is a second preset value, it indicates that a report corresponding to the first bit has not been reported to the network-side device;

in a case that the UCI comprises the second indication information, the second indication information is a second bitmap; and when a second bit in the second bitmap is a third preset value, it indicates that a report corresponding to the second bit has been reported to the network-side device; or when a second bit in the second bitmap is a fourth preset value, it indicates that a report corresponding to the second bit has not been reported to the network-side device; or in a case that the UCI comprises the third indication information, the third indication information is a third bitmap; and when a third bit in the third bitmap is a fifth preset value, it indicates that a report corresponding to the third bit has been reported to the network-side device; or when a third bit in the third bitmap is a sixth preset value, it indicates that a report corresponding to the third bit has not been reported to the network-side device.

7. A terminal comprising: a memory, a processor, and a program that is stored in the memory and capable of running on the processor, wherein when the program is executed by the processor, the processor is configured to:

determine, based on detection of a reporting trigger event, whether to report at least one of an event-based beam report or an event-based channel state information (CSI) report to a network-side device, wherein, when the processor is configured to determine, based on detection of the reporting trigger event, whether to report at least one of the event-based beam report or the event-based CSI report to the network-side device, the processor is specifically configured to:

when the reporting trigger event occurs, stop reporting at least one of the event-based beam report or the event-based CSI report to the network-side device, wherein the reporting at least one of the event-based beam report or the event-based CSI report to the network-side device comprises:

reporting at least one of the event-based beam report or the event-based CSI report to the network-side device by using a physical uplink control channel (PUCCH); or reporting at least one of the event-based beam report or the event-based CSI report to the network-side device by using a semi-persistent scheduling physical uplink shared channel (PUSCH); or reporting at least one of the event-based beam report or the event-based CSI report to the network-side device by using a media access control (MAC) control element (CE), wherein, when reporting at least one of the event-based beam report or the event-based CSI report to the network-side device by using the physical uplink control channel (PUCCH), the processor is configured to:

in a case that the PUCCH collides with a PUSCH, preferentially sending a higher-priority one of the PUCCH and the PUSCH;

or, when reporting at least one of the event-based beam report or the event-based CSI report to the network-side device by using the physical uplink control channel (PUCCH), the processor is configured to perform at least one of following steps:

when the event-based beam report is a plurality of beam reports, sending uplink control information (UCI) to the network-side device, wherein the UCI comprises first indication information, and the first indication information is used to indicate information about an event-based beam report reported to the network-side device;

when the event-based CSI report is a plurality of CSI reports, sending UCI to the network-side device, wherein the UCI comprises second indication information, and the second indication information is used to indicate information about an event-based CSI report reported to the network-side device; or when reporting the event-based beam report and the event-based CSI report to the network-side device, and when the event-based beam report is one or more beam reports and the event-based CSI report is one or more CSI reports, sending UCI to the network-side device, wherein the UCI comprises third indication information, and the third indication information is used to indicate information about an event-based beam report and information about an event-based CSI report reported to the network-side device.

8. The terminal according to claim 7, wherein before the determining, based on detection of the reporting trigger event, whether to report at least one of the event-based beam report or the event-based channel state information (CSI) report to the network-side device, the processor is configured to:

receive first information from the network-side device, wherein the first information is used to indicate whether event-based reporting is enabled.

9. The terminal according to claim 8, wherein the processor is configured to:

in a case that the first information is used to indicate that event-based reporting is enabled, when the reporting trigger event occurs, stop reporting at least one of the event-based beam report or the event-based CSI report to the network-side device; or in a case that the first information is used to indicate that event-based reporting is disabled, report at least one of a beam report or a CSI report to the network-side device.

10. The terminal according to claim 7, wherein when the event-based beam report is reported to the network-side device by using the PUCCH, the event-based beam report is a plurality of event-based beam reports configured by the network-side device by using radio resource control (RRC) or triggered by the network-side device by using downlink control information (DCI);

when the event-based CSI report is reported to the network-side device by using the PUCCH, the event-based CSI report is a plurality of event-based CSI reports configured by the network-side device by using RRC or triggered by the network-side device by using DCI; or when the event-based beam report and the event-based CSI report are reported to the network-side device by using the PUCCH, the event-based beam report and the event-based CSI report are one or more event-based beam reports and one or more event-based CSI reports configured by the network-side device by using RRC or triggered by the network-side device by using DCI.

11. The terminal according to claim 10, wherein the processor is configured to:

determine, from the plurality of event-based beam reports, from the plurality of event-based CSI reports, or from both the plurality of event-based beam reports and the plurality of event-based CSI reports, at least one of a to-be-reported event-based beam report or a to-be-reported event-based CSI report; and report at least one of the to-be-reported event-based beam report or the to-be-reported event-based CSI report to the network-side device by using the PUCCH.

12. A non-transient computer-readable storage medium, wherein the computer-readable storage medium stores a program, and when the program is executed by a processor to implement following steps:

determining, based on detection of a reporting trigger event, whether to report at least one of an event-based beam report or an event-based channel state information (CSI) report to a network-side device, wherein the determining, based on detection of the reporting trigger event, whether to report at least one of the event-based beam report or the event-based channel state information (CSI) report to a network-side device comprises:

when the reporting trigger event occurs, stopping reporting at least one of the event-based beam report or the event-based CSI report to the network-side device, wherein the reporting at least one of the event-based beam report or the event-based CSI report to the network-side device comprises:

reporting at least one of the event-based beam report or the event-based CSI report to the network-side device by using a physical uplink control channel (PUCCH); or reporting at least one of the event-based beam report or the event-based CSI report to the network-side device by using a semi-persistent scheduling physical uplink shared channel (PUSCH); or reporting at least one of the event-based beam report or the event-based CSI report to the network-side device by using a media access control (MAC) control element (CE), wherein, when reporting at least one of the event-based beam report or the event-based CSI report to the network-side device by using the physical uplink control channel (PUCCH), the method further comprises:

in a case that the PUCCH collides with a PUSCH, preferentially sending a higher-priority one of the PUCCH and the PUSCH;

or, when reporting at least one of the event-based beam report or the event-based CSI report to the network-side device by using the physical uplink control channel (PUCCH), the method further comprises at least one of the following steps:

when the event-based beam report is a plurality of beam reports, sending uplink control information (UCI) to the network-side device, wherein the UCI comprises first indication information, and the first indication information is used to indicate information about an event-based beam report reported to the network-side device;

when the event-based CSI report is a plurality of CSI reports, sending UCI to the network-side device, wherein the UCI comprises second indication information, and the second indication information is used to indicate information about an event-based CSI report reported to the network-side device; or when reporting the event-based beam report and the event-based CSI report to the network-side device, and when the event-based beam report is one or more beam reports and the event-based CSI report is one or more CSI reports, sending UCI to the network-side device, wherein the UCI comprises third indication information, and the third indication information is used to indicate information about an event-based beam report and information about an event-based CSI report reported to the network-side device.

* * * * *